United States Patent [19]

Schaetzer

[11] Patent Number: 5,602,238

[45] Date of Patent: Feb. 11, 1997

[54] AZOTHIOPHENE DYES CONTAINING A 2,4,6-TRIAMINO-3-CYANOPYRIDINE COUPLING COMPONENT

[75] Inventor: Jürgen Schaetzer, Rheinfelden, Germany

[73] Assignee: Ciba-Geigy Corporation, Tarrytown, N.Y.

[21] Appl. No.: 519,226

[22] Filed: Aug. 25, 1995

[30] Foreign Application Priority Data

Aug. 29, 1994 [CH] Switzerland ................ 2639/94

[51] Int. Cl.$^6$ ............... C09B 29/033; C09B 29/42; C09B 67/22; D06P 3/54

[52] U.S. Cl. .............. 534/766; 534/773; 8/639; 8/922

[58] Field of Search ................ 534/766, 773; 8/639, 922

[56] References Cited

U.S. PATENT DOCUMENTS

| | | | |
|---|---|---|---|
| 4,016,152 | 4/1977 | Dehnert et al. | 260/156 |
| 4,033,943 | 7/1977 | Ramanathan et al. | 534/766 X |
| 4,038,268 | 7/1977 | Moritz et al. | 260/156 |
| 4,066,637 | 1/1978 | Ramanathan | 534/766 X |
| 4,068,085 | 1/1978 | Ramanathan et al. | 534/766 X |
| 4,156,086 | 5/1979 | Moritz et al. | 546/286 |
| 4,208,324 | 6/1980 | Ramanathan | 534/766 |
| 4,243,583 | 1/1981 | Portmann | 534/766 X |
| 4,401,600 | 8/1983 | Portmann . | |
| 4,855,412 | 8/1989 | Dehnert et al. | 534/766 |
| 4,855,413 | 8/1989 | Dehnert et al. | 534/766 |
| 4,965,346 | 10/1990 | Dehnert et al. | 534/766 |
| 5,112,362 | 5/1992 | Hahn et al. | 8/639 |
| 5,196,521 | 3/1993 | Ramanathan et al. | 534/773 |
| 5,199,956 | 4/1993 | Schlenker et al. | 8/922 X |
| 5,330,543 | 7/1994 | Hansen et al. | 534/766 |

FOREIGN PATENT DOCUMENTS

| | | |
|---|---|---|
| 0579192 | 1/1994 | European Pat. Off. . |
| A-0579192 | 1/1994 | European Pat. Off. . |
| 2349373 | 4/1975 | Germany . |
| 606297 | 10/1978 | Switzerland ............ 534/766 |
| 1461378 | 1/1977 | United Kingdom . |
| A-1594384 | 7/1991 | United Kingdom . |

Primary Examiner—Fiona T. Powers
Attorney, Agent, or Firm—Kevin T. Mansfield

[57] ABSTRACT

The present invention relates to disperse dyes having the formula

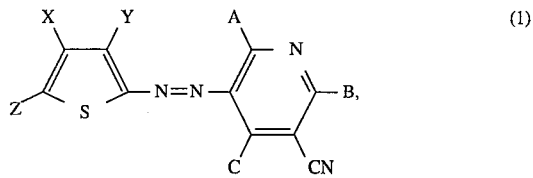

wherein X is hydrogen, halogen, $C_1$–$C_8$alkyl or phenyl which is unsubstituted or substituted by fluoro, chloro, bromo, methyl, methoxy or nitro; Y is cyano, $C_1$–$C_4$alkoxycarbonyl or nitro; Z is nitro, cyano, acetyl, benzoyl, formyl, —CH=C(CN)$_2$, —CH=C(CN)CO$_2$R or carbamoyl which is unsubstituted or substituted by $C_1$–$C_4$alkyl, $C_1$–$C_4$alkoxy, $C_1$–$C_4$alkoxy-$C_1$–$C_4$alkyl, phenyl or ($C_1$–$C_4$alkyl)$_{1-2}$phenyl, and R is $C_1$–$C_4$alkyl, or X and Z or Y and Z are each simultaneously $C_1$–$C_4$alkoxycarbonyl, and A, B and C are each independently of one another —NH$_2$ or —N(R$_1$)R$_2$, and R$_1$ and R$_2$ are each independently of each other hydrogen, phenyl which is unsubstituted or substituted by hydroxy, $C_1$–$C_4$alkyl, halogen or $C_1$–$C_4$alkoxy, or is unsubstituted or $C_1$–$C_4$alkyl-substituted $C_4$–$C_7$cycloalkyl, or $C_1$–$C_{18}$alkyl which is unsubstituted or substituted by halogen, cyano, $C_2$–$C_4$alkanoyloxy, hydroxy, $C_1$–$C_4$alkoxy, phenoxy or phenyl, which phenyl or phenoxy is in turn unsubstituted or substituted by hydroxy, $C_1$–$C_4$alkyl, halogen or $C_1$–$C_4$alkoxy, and the $C_1$–$C_{18}$alkyl radical may be interrupted by oxygen atoms, or wherein R$_1$ and R$_2$, together with the linking nitrogen atom, form a piperidinyl, pyrrolidinyl or morpholinyl radical, to a process for their preparation and to the use thereof for dyeing textile materials.

10 Claims, No Drawings

AZOTHIOPHENE DYES CONTAINING A 2,4,6-TRIAMINO-3-CYANOPYRIDINE COUPLING COMPONENT

The present invention relates to disperse dyes, to a process for their preparation and to the use thereof for dyeing textile materials.

The dyes of this invention have the formula

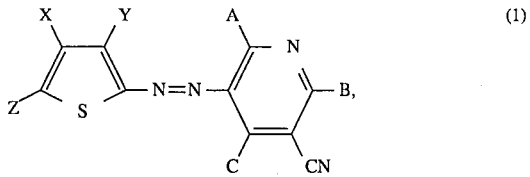

wherein X is hydrogen, halogen, $C_1$–$C_8$alkyl or phenyl which is unsubstituted or substituted by fluoro, chloro, bromo, methyl, methoxy or nitro; Y is cyano, $C_1$–$C_4$alkoxycarbonyl or nitro; Z is nitro, cyano, acetyl, benzoyl, formyl, —CH=C(CN)$_2$, —CH=C(CN)CO$_2$R or carbamoyl which is unsubstituted or substituted by $C_1$–$C_4$alkyl, $C_1$–$C_4$alkoxy, $C_1$–$C_4$alkoxy-$C_1$–$C_4$alkyl, phenyl or ($C_1$–$C_4$alkyl)$_{1-2}$phenyl, and R is $C_1$–$C_4$alkyl, or X and Z or Y and Z are each simultaneously $C_1$–$C_4$alkoxycarbonyl, and A, B and C are each independently of one another —NH$_2$ or —N(R$_1$)R$_2$, and R$_1$ and R$_2$ are each independently of each other hydrogen, phenyl which is unsubstituted or substituted by hydroxy, $C_1$–$C_4$alkyl, halogen or $C_1$–$C_4$alkoxy, or is unsubstituted or $C_1$–$C_4$alkyl-substituted $C_4$–$C_7$cycloalkyl, or $C_1$–$C_{18}$alkyl which is unsubstituted or substituted by halogen, cyano, $C_2$–$C_4$alkanoyloxy, hydroxy, $C_1$–$C_4$alkoxy, phenoxy or phenyl, which phenyl or phenoxy is in turn unsubstituted or substituted by hydroxy, $C_1$–$C_4$alkyl, halogen or $C_1$–$C_4$alkoxy, and the $C_1$–$C_{18}$alkyl radical may be interrupted by oxygen atoms, or wherein R$_1$ and R$_2$, together with the linking nitrogen atom, form a piperidinyl, pyrrolidinyl or morpholinyl radical.

$C_1$–$C_4$Alkyl in formula (1) may typically be: methyl, ethyl, isopropyl, n-propyl, isobutyl, n-butyl, sec-butyl, tert-butyl. The $C_1$–$C_8$alkyl radical and the $C_1$–$C_{18}$alkyl radical may also denote, in addition to those radicals cited above in connection with $C_1$–$C_4$alkyl, straight-chain or branched alkyl radicals such as pentyl, hexyl, octyl, decyl or undecyl.

The invention relates to dyes of formula (1) and to the mixtures of isomers wherein, typically, A is —NH$_2$, B is the radical of formula —N(R$_1$)R$_2$ and C is NH$_2$, or wherein B is —NH$_2$, A is the radical of formula —N(R$_1$)R$_2$ and C is NH$_2$, or wherein C is the radical of formula —N(R$_1$)R$_2$ and A or B is the radical of formula —N(R$_1$)R$_2$ and B or A is —NH$_2$, or these mixtures of isomers in admixture with the compound wherein A and B are —NH$_2$ and C is —N(R$_1$)R$_2$, or A, B and C are —NH$_2$ or —N(R$_1$)R$_2$.

Y and Z in the significance of $C_1$–$C_4$alkoxycarbonyl may suitably be: methoxycarbonyl, ethoxycarbonyl, propoxycarbonyl or butoxycarbonyl.

$C_1$–$C_4$Alkoxy in formula (1) may be methoxy, ethoxy, isopropoxy, n-propoxy and n-butoxy.

$C_1$–$C_4$Alkoxy-$C_1$–$C_4$alkyl in formula (1) is typically methoxyethyl or ethoxyethyl.

($C_1$–$C_4$Alkyl)$_{1-2}$phenyl may suitably be tolyl and xylyl.

$C_4$–$C_7$Cycloalkyl may suitably be cyclopentyl, cyclohexyl or cycloheptyl.

Halogen in formula (1) will be typically be taken to mean fluoro, bromo, iodo or, preferably, chloro.

$C_2$–$C_4$Alkanoyloxy may suitably be —O—CO—CH$_3$, —O—CO—C$_2$H$_5$ or —O—CO—C$_3$H$_7$.

Preferred dyes of formula (1) are those wherein X is hydrogen, $C_1$–$C_8$alkyl or phenyl which is unsubstituted or substituted by fluoro, chloro, bromo, methyl, methoxy or nitro; Y is cyano, $C_1$–$C_4$alkoxycarbonyl or nitro; Z is cyano, acetyl, benzoyl or carbamoyl which is unsubstituted or substituted by $C_1$–$C_4$alkyl, $C_1$–$C_4$alkoxy, $C_1$–$C_4$alkoxy-$C_1$–$C_4$alkyl, phenyl or ($C_1$–$C_4$alkyl)$_{1-2}$phenyl, or X and Z or Y and Z are each simultaneously $C_1$–$C_4$alkoxycarbonyl, C is —NH$_2$, and one of A and B is —NH$_2$ and the other is —N(R$_1$)R$_2$, and R$_1$ and R$_2$ are each independently of the other hydrogen, phenyl which is unsubstituted or substituted by hydroxy, $C_1$–$C_4$alkyl, halogen or $C_1$–$C_4$alkoxy; unsubstituted or $C_1$–$C_4$alkyl-substituted $C_4$–$C_7$cycloalkyl, or $C_1$–$C_{18}$alkyl which is unsubstituted or substituted by halogen, cyano, $C_2$–$C_4$alkanoyloxy, hydroxy, $C_1$–$C_4$alkoxy, phenoxy or phenyl, which phenyl or phenoxy is unsubstituted or substituted by hydroxy, $C_1$–$C_4$alkyl, halogen or $C_1$–$C_4$alkoxy, and the C–$C_{18}$alkyl may be interrupted by oxygen atoms, or wherein R$_1$ and R$_2$, together with the linking nitrogen atom, form a piperidinyl, pyrrolidinyl or morpholinyl radical.

Particularly preferred dyes of formula (1) are those wherein C is —NH$_2$, and wherein R$_2$ is unsubstituted $C_1$–$C_8$alkyl or a radical of formula

wherein R$_3$ is $C_2$–$C_4$alkylene, R$_4$ is $C_2$–$C_8$alkylene and L is hydrogen, hydroxy, —O-phenyl, —O—$C_1$–$C_8$alkyl or —OCO—$C_1$–$C_8$alkyl.

In very particularly preferred dyes of formula (1), X is unsubstituted $C_1$–$C_8$alkyl, preferably methyl, most preferably in dyes of formula (1), wherein C is —NH$_2$.

Important dyes are those of formula

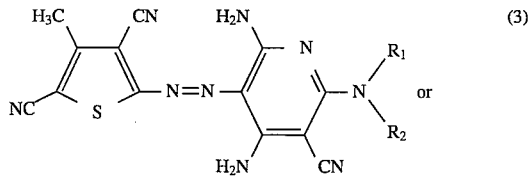

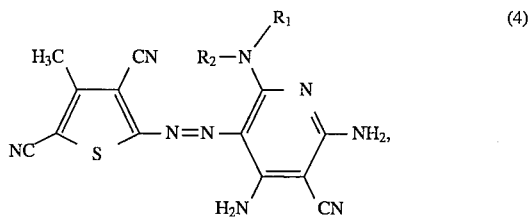

wherein R$_1$ is hydrogen, and R$_2$ is as defined for formula (1).

Particularly important dyes are those of formula (3) or (4), wherein R$_1$ is hydrogen, and R$_2$ is $C_1$–$C_6$alkyl, preferably n-butyl, n-pentyl or n-hexyl, $C_1$–$C_3$alkoxy-$C_2$–$C_3$alkyl, phenyl, methoxyphenyl or a radical of formula

wherein R$_5$ is $C_2$–$C_3$alkylene, R$_6$ is $C_2$–$C_4$alkylene and Q is phenoxy, $C_1$–$C_4$alkoxy or propionyloxy, or wherein R$_1$ and R$_2$, together with the linking nitrogen atom, form a pyrrolidinyl, piperidinyl or morpholinyl radical.

With respect to the mixtures of isomers, the identical preferences apply as indicated above in connection with X, Y, Z, A, B and C. Interesting mixtures are those comprising at least two dyes of formula (1), wherein X, Y, Z, A, B and C have the preferred, very preferred and particularly preferred meanings indicated above. Particularly interesting mixtures are also those comprising at least two dyes of formulae (3) and (4).

The invention further relates to a process for the preparation of the dyes of formula (1). The dyes of this invention are prepared in per se known manner, typically by diazotising an amine of formula

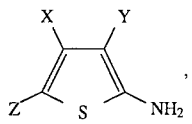 (6)

wherein X, Y and Z are as defined for formula (1), and coupling the diazo compound so obtained to a coupling component of formula

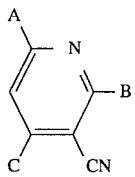 (7)

wherein A, B and C are as defined for formula (1).

The compounds of formulae (6) and (7) are known or can be prepared in per se known manner, and diazotisation and coupling are carried out in conventional manner.

A typical example of a compound of formula (6) is: 2-amino-3,5-dicyano-4-methylthiophene.

Illustrative examples of compounds of formula (7) are:
2,4-diamino-5-cyano-6-n-butylaminopyridine,
2,4-diamino-5-cyano-6-n-pentylaminopyridine,
2,4-diamino-5-cyano-6-n-hexylaminopyridin.

The mixtures of dyes of formula (1) can be prepared in analogy to known methods by coupling diazotised aromatic amines to the corresponding pyridine derivatives. The coupling components are conveniently obtained by reacting malodinitrile with hydrogen bromide to bromopyridine, and subsequently exchanging the bromine atom for an amine radical.

Another route for preparing the mixtures of compounds of formula (1) comprises dimerising malodinitrile by known methods followed by coupling to a diazotised aromatic amine to give the corresponding hydrazone. The subsequent reaction with a primary or secondary amine in the presence of a carboxylic acid yields a mixture of 2,4,6-triaminoazopyridine dyes in which one, two or all three positions are occupied by a —NH$_2$ group or —N(R$_1$)R$_2$.

The novel dyes of formula (1) can be used as dyes for dyeing and printing semi-synthetic and, preferably, synthetic hydrophobic fibre materials, especially textile materials. Textile materials made from blends that contain such semi-synthetic or synthetic hydrophobic textile materials can also be dyed or printed with the novel compounds.

Semi-synthetic textile materials are in particular cellulose secondary acetate and cellulose triacetate.

Synthetic hydrophobic textile materials consist primarily of linear aromatic polyesters, typically those from terephthalic acid and glycols, especially ethylene glycol, or condensates of terephthalic acid and 1,4-bis(hydroxymethyl)cyclohexane; from polycarbonates, e.g. those from α,α-dimethyl-4,4'-dihydroxydiphenylmethane and phosgene, or from polyvinyl chloride and polyamide fibres.

The novel compounds are applied to the textile materials by known dyeing methods. Polyester materials are conveniently dyed from an aqueous dispersion by the exhaust process in the presence of customary anionic or nonionic detergents and usually of customary swelling agents (carriers) in the temperature range from 80° to 140° C. Cellulose secondary acetate is preferably dyed in the temperature range from about 65° to 85° C., and cellulose triacetate in the temperature range up to 115° C.

The novel dyes do not stain wool and cotton simultaneously present in the dyebath or effect only minor staining (very good resist), so that they may also readily be used for dyeing polyester/wool and polyester/cellulose blended fabrics.

The novel dyes are suitable for dyeing by the thermosol process, for exhaust dyeing and for printing.

The textile material may be in any form of presentation, including fibres, yarn or nonwoven fabric, or woven or knitted fabric.

It is expedient to convert the novel dyes before use into a dye formulation. This is done by milling the dye to an average particle size of 0.1 to 10 micron. Milling can be carded out in the presence of a dispersant. Typically the dye is milled with a dispersant, or kneaded in paste form with a dispersant and thereafter vacuum dried or spray dried. Printing pastes and dyebaths can be prepared by adding water to the resultant formulations.

The customary thickeners will be used for printing. Illustrative examples of such thickeners are modified or unmodified natural products, typically alginates, British gum, gum arabic, crystal gum, carob bean gum, tragacanth, carboxymethyl cellulose, hydroxyethyl cellulose, starch or synthetic products, including polyacrylamides, polyacrylic acid or copolymers thereof or polyvinyl alcohols.

The cited materials, especially polyester material, are dyed with the novel dyes in level reddish-orange or red shades of very good end-use properties, in particular fastness to heat-setting, pleating, chlorine and wetfastness properties such as fastness to water, perspiration and washing. The dyeings are also distinguished by very good rubfastness. To be singled out for special mention is the very good lightfastness of the dyeings together with superior brilliance. The novel dyes are also distinguished by good build-up, excellent fastness to sublimation and very good fastness to thermomigration.

The novel dyes can also be readily used for obtaining mixed shades in conjunction with other dyes or, in conjunction with a suitable yellow and blue dye, for trichromatic dyeing. It is, of course, also possible to use mixtures of the novel dyes with one another.

Owing to their very good lightfastness, even at elevated temperature, the novel dyes are preeminently suitable for dyeing polyester textile material for automobile upholstery.

Further objects of the invention are the aformentioned use of the azo dyes of formula (1) and a process for dyeing or printing semi-synthetic material or synthetic hydrophobic material, preferably textile material, which comprises applying to, or incorporating in, said material one or more than one compound of formula (1). The hydrophobic fibre material is preferably polyester textile material. Further substrates which can be treated by the process of the invention and preferred process conditions have been discussed above in the more detailed description of the use of the novel compounds.

The hydrophobic fibre material, preferably polyester textile material, dyed or printed by the instant process, also constitutes an object of the invention.

The invention is illustrated in more detail by the following non-limitative Examples in which, unless otherwise indicated, parts and percentages are by weight.

EXAMPLE 1

30.5 parts of 2-bromo-3-cyano-4,6-diaminopyridine, 250 parts of isopropanol, 51 parts of 2-phenoxyethoxypropylamine and 32 parts of potassium carbonate are heated to 120° C. for 36 hours in an autoclave under a pressure of 7–8 bar. When the reaction is complete, excess potassium carbonate is removed by filtration and the solvent is distilled off on a rotary evaporator. The residue is a dark oil which contains the compound of formula

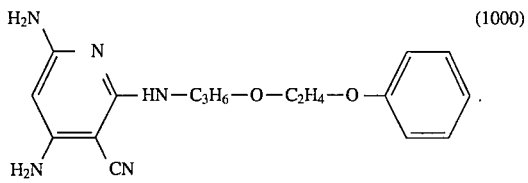 (1000)

The crude product can be further used for the described coupling.

With cooling, 0.41 part of 2-amino-3,5-dicyano-4-methylthiophene are dissolved in 6.4 parts of 65% sulfuric acid. With further cooling, 0.88 part of nitrosylsulfuric acid (40%) are added dropwise to the solution at 0°–5° C. and the reaction mixture is stirred for 90 minutes at this temperature. Excess nitrous acid is destroyed with ground urea. The resultant diazo solution is slowly run into a solution of 0.82 part of 2-phenoxyethoxypro-pylamino-3-cyano-4,6-diaminopyridine in 16 parts of glacial acetic acid/propionic acid (ratio 5:1) and 4 parts of water and the mixture is stirred for c. 60 minutes. When the coupling is complete, the pH is cautiously adjusted to c. 2.8 with 10 parts of sodium hydroxide solution (30%) and diluted with 10 parts of water. The dye of formula

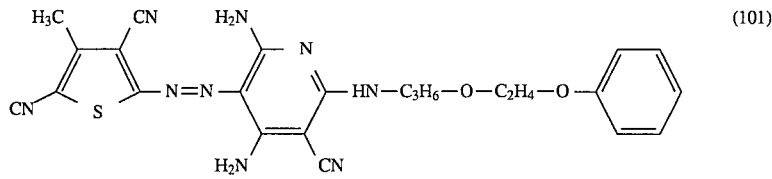 (101)

is isolated by filtration, washed with water and dried. It dyes polyester fibres in brilliant red shades of excellent fastness properties, in particular good lightfastness.

EXAMPLE 2

The diazotisation mixture obtained according to Example 1 is added to a solution consisting of 0.57 part of n-butylamino-3-cyano-4,6-diaminopyridine in 4 parts of glacial acetic acid/propionic acid (ratio 5:1) and 2 parts of water. The mixture is diluted by the dropwise addition of 5 pans of water and the pH is adjusted to 2.8 with 5 parts of sodium hydroxide solution (30%). The resultant dye is isolated by filtration, washed with water and dried. It has the formula

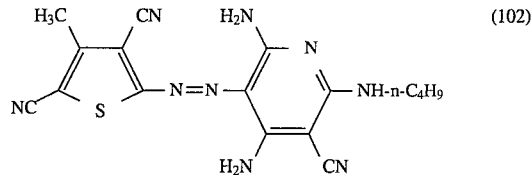 (102)

and dyes polyester in brilliant red shades of excellent fastness properties.

Examples 3–54

Following the procedure as described in Examples 1 and 2, the dyes listed in the following Table are obtained. They dye polyester fibres in red shades.

TABLE 1

| Example | $R_1$ | $R_2$ | and $-N(R_1)R_2$ |
|---|---|---|---|
| 3 | —H | —(CH$_2$)$_4$—CH$_3$ | |
| 4 | —H | —(CH$_2$)$_5$—CH$_3$ | |
| 5 | | |  |

TABLE 1-continued

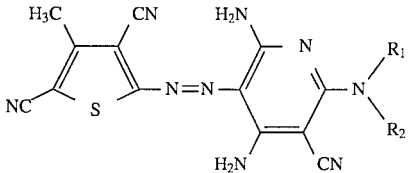

| Example | R₁ | R₂ | and $-N(R_1)R_2$ |
|---|---|---|---|
| 6 | | | 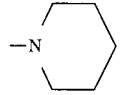 |
| 7 | | | 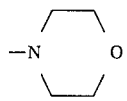 |
| 8 | —H | —(CH₂)₃—O—(CH₂)₂—O—CH₃ | |
| 9 | —H | —(CH₂)₃—O—(CH₂)₂—O—C₂H₅ | |
| 10 | —H | —(CH₂)₃—O—(CH₂)₂—O—C₄H₉ | |
| 11 | —H | —(CH₂)₃—O—CH₂—CH(C₂H₅)—C₄H₉ | |
| 12 | —H | —(CH₂)₂—O—(CH₂)₂—OCOCH₃ | |
| 13 | —H | —(CH₂)₂—O—(CH₂)₂—OH | |
| 14 | —H | —(CH₂)₃—O—(CH₂)₄—OCOCH₃ | |
| 15 | —H | —(CH₂)₃—O—(CH₂)₄—OH | |
| 16 | —H | —(CH₂)₂—O—(CH₂)₂—OCOC₂H₅ | |
| 17 | —H | —(CH₂)₃—O—(CH₂)₄—OCOC₂H₅ | |
| 18 | —H | —(CH₂)₃—O—(CH₂)₄—O—CH₃ | |
| 19 | —H | —(CH₂)₂—O—(CH₂)₄—O—C₂H₅ | |
| 20 | —H | —(CH₂)₂—O—(CH₂)₄—O—C₄H₉ | |
| 21 | —H | phenyl | |
| 22 | —H | 4-methoxyphenyl | |
| 23 | —H | 2-methoxyphenyl | |
| 24 | —H | —(CH₂)₃—O—CH₃ | |
| 25 | —H | —(CH₂)₂—O—CH₃ | |
| 26 | —H | —(CH₂)₂—O—C₂H₅ | |
| 27 | —H | —(CH₂)₃—O—CH(CH₃)₂ | |
| 28 | —H | benzyl | |

Following the procedure as described in Examples 1 and 2, the dyes listed in the following Table are obtained. They dye polyester fibres in red shades.

TABLE 2

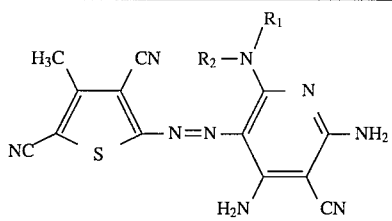

| Example | R₁ | R₂ | and $-N(R_1)_2$ |
|---|---|---|---|
| 29 | —H | —(CH₂)₄—CH₃ | |
| 30 | —H | —(CH₂)₅—CH₃ | |
| 31 | | |  |

TABLE 2-continued

[Structure: thiophene with H₃C, CN, NC substituents, linked via N=N to pyridine ring bearing R₂—N(R₁), NH₂, H₂N, CN groups]

| Example | R₁ | R₂ | and —N(R₁)₂ |
|---|---|---|---|
| 32 | | | —N(piperidinyl) |
| 33 | | | —N(morpholinyl) |
| 34 | —H | —(CH₂)₃—O—(CH₂)₂—O—CH₃ | |
| 35 | —H | —(CH₂)₃—O—(CH₂)₂—O—C₂H₅ | |
| 36 | —H | —(CH₂)₃—O—(CH₂)₂—O—C₄H₉ | |
| 37 | —H | —(CH₂)₃—O—CH₂—CH(C₂H₅)—C₄H₉ | |
| 38 | —H | —(CH₂)₂—O—(CH₂)₂—OCOCH₃ | |
| 39 | —H | —(CH₂)₂—O—(CH₂)₂—OH | |
| 40 | —H | —(CH₂)₃—O—(CH₂)₄—OCOCH₃ | |
| 41 | —H | —(CH₂)₃—O—(CH₂)₄—OH | |
| 42 | —H | —(CH₂)₂—O—(CH₂)₂—OCOC₂H₅ | |
| 43 | —H | —(CH₂)₃—O—(CH₂)₄—OCOC₂H₅ | |
| 44 | —H | —(CH₂)₃—O—(CH₂)₄—O—CH₃ | |
| 45 | —H | —(CH₂)₃—O—(CH₂)₄—O—C₂H₅ | |
| 46 | —H | —(CH₂)₃—O—(CH₂)₄—O—C₄H₉ | |
| 47 | —H | phenyl | |
| 48 | —H | 4-methoxyphenyl | |
| 49 | —H | 2-methoxyphenyl | |
| 50 | —H | —(CH₂)₃—O—CH₃ | |
| 51 | —H | —(CH₂)₂—O—CH₃ | |
| 52 | —H | —(CH₂)₂—O—C₂H₅ | |
| 53 | —H | —(CH₂)₃—O—CH(CH₃)₂ | |
| 54 | —H | benzyl | |

EXAMPLE 55

2.5 parts of the dye obtained in analogy to the procedure described in Example 1, but starting from 2-amino-3,5-dicyano-4-chlorothiophene instead of 2-amino-3,5-dicyano-4-methylthiophene, are stirred together with 0.44 part of malodinitrile and 0.33 part of sodium acetate in 30 ml of propanol for 2 hours at 20° C. Afterwards another 0.22 part of malodinitrile is added and the batch is heated to 50° C. After a further 2 hours the reaction is complete. The reaction mixture is cooled to 20° C., the dark precipitate is isolated by filtration, washed with with 160 parts of propanol and dried, affording 2.2 parts of the dye of formula

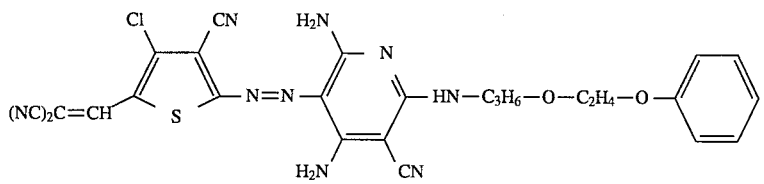

which dyes polyester material in reddish blue shades.

EXAMPLE 56

1.7 parts of ice are mixed with 9.3 parts of sulfuric acid (100%) and the mixture is cooled to 20° C. and diluted with 1.5 parts of glacial acetic acid. The mixture is then cooled to 0° C. and 3.5 parts of nitrosylsulfuric acid are added dropwise (40%). With cooling at 0°–5° C., 1.84 parts of 2-amino-3-cyano-4-chloro-5-formylthiophene are added to this mixture over 15 minutes. The reaction mixture is then stirred for c. 2.5 hours at 0°–5° C. until diazotisation is complete. Excess nitrite is removed with urea.

The diazotisation mixture so obtained is run over 30 minutes into a solution of 3.6 parts of 2-phenoxyethoxypropylamino-3-cyano-4,6-diaminopyridine in 15 parts of glacial acetic acid, 30 parts of water and 5 parts of 1N hydrochloric acid, and the reaction mixture is then stirred for c. 45 minutes. The pH is then adjusted to c. 3 with 28 parts of sodium hydroxide solution (30%). The precipitated dye of formula

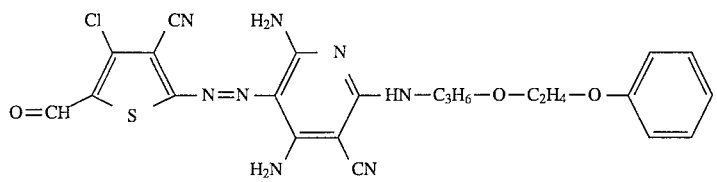

is isolated by filtration, washed free of salt and dried. It dyes polyester in a ruby shade.

The dyes listed in the following Table are prepared in analogy to the procedure described in Example 56. They dye polyester fibres in red shades.

grinding stock is converted into a 5% aqueous dispersion.

With this formulation a 1% dyeing is produced by the HT exhaust method at 130° C. (based on pigment and substrate) on polyester fabric and given a reductive afterclear. The red dyeing so obtained has very good end-use properties and, in particular, excellent lightfastness.

TABLE 3

| Example | $R_1$ | $R_2$ and $-N(R_1)R_2$ |
|---|---|---|
| 57 | —H | $-(CH_2)_4-CH_3$ |
| 58 | —H | $-(CH_2)_5-CH_3$ |
| 59 | | —N⟨pyrrolidine⟩ |
| 60 | | —N⟨piperidine⟩ |
| 61 | | —N⟨morpholine⟩ |
| 62 | —H | $-(CH_2)_3-O-(CH_2)_2-O-CH_3$ |
| 63 | —H | $-(CH_2)_3-O-(CH_2)_2-O-C_2H_5$ |
| 64 | —H | $-(CH_2)_3-O-(CH_2)_2-O-C_4H_9$ |
| 65 | —H | $-(CH_2)_3-O-CH_2-CH(C_2H_5)-C_4H_9$ |
| 66 | —H | $-(CH_2)_2-O-(CH_2)_2-OCOCH_3$ |
| 67 | —H | $-(CH_2)_2-O-(CH_2)_2-OH$ |
| 68 | —H | $-(CH_2)_3-O-(CH_2)_4-OCOCH_3$ |
| 69 | —H | $-(CH_2)_3-O-(CH_2)_4-OH$ |
| 70 | —H | $-(CH_2)_2-O-(CH_2)_2-OCOC_2H_5$ |
| 71 | —H | $-(CH_2)_3-O-(CH_2)_4-OCOC_2H_5$ |
| 72 | —H | $-(CH_2)_3-O-(CH_2)_4-O-CH_3$ |
| 73 | —H | $-(CH_2)_3-O-(CH_2)_4-O-C_2H_5$ |
| 74 | —H | $-(CH_2)_3-O-(CH_2)_4-O-C_4H_9$ |
| 75 | —H | phenyl |
| 76 | —H | 4-methoxyphenyl |
| 77 | —H | 2-methoxyphenyl |
| 78 | —H | $-(CH_2)_3-O-CH_3$ |
| 79 | —H | $-(CH_2)_2-O-CH_3$ |
| 80 | —H | $-(CH_2)_2-O-C_2H_5$ |
| 81 | —H | $-(CH_2)_3-O-CH(CH_3)_2$ |
| 82 | —H | benzyl |

EXAMPLE 83

1 g of the dye described in Example 1 is ground together with 17 g of water and 2 g of a commercial dispersant of the dinaphthylmethane disulfonate type in a sand mill and the

What is claimed is:

1. A dye of the formula

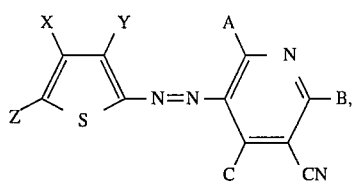

(1)

wherein X is hydrogen, halogen, $C_1$–$C_8$alkyl or phenyl which is unsubstituted or substituted by fluoro, chloro, bromo, methyl, methoxy or nitro; Y is cyano or nitro; Z is nitro, cyano, acetyl, benzoyl, formyl, —CH=C(CN)$_2$ or —CH=C(CN)CO$_2$R, and R is $C_1$–$C_4$alkyl, and A, B and C are each independently of one another —NH$_2$ or —N(R$_1$)R$_2$, and R$_1$ and R$_2$ are each independently of each other hydrogen, phenyl which is unsubstituted or substituted by hydroxy, $C_1$–$C_4$alkyl, halogen or $C_1$–$C_4$alkoxy, or is unsubstituted or $C_1$–$C_4$alkyl-substituted $C_4$–$C_7$cycloalkyl, or $C_1$–$C_{18}$alkyl which is unsubstituted or substituted by halogen, cyano, $C_2$–$C_4$alkanoyloxy, hydroxy, $C_1$–$C_4$alkoxy, phenoxy or phenyl, which phenyl or phenoxy is in turn unsubstituted or substituted by hydroxy, $C_1$–$C_4$alkyl, halogen or $C_1$–$C_4$alkoxy, and the $C_1$–$C_{18}$alkyl radical is optionally interrupted by one or more oxygen atoms, or wherein R$_1$ and R$_2$, together with the linking nitrogen atom, form a piperidinyl, pyrrolidinyl or morpholinyl radical.

2. A dye according to claim 1, wherein X is hydrogen, $C_1$–$C_8$alkyl or phenyl which is unsubstituted or substituted by fluoro, chloro, bromo, methyl, methoxy or nitro; Y is cyano or nitro; Z is cyano, acetyl or benzoyl, C is —NH$_2$, and one of A and B is —NH$_2$ and the other is —N(R$_1$)R$_2$, and R$_1$ and R$_2$ are each independently of the other hydrogen, phenyl which is unsubstituted or substituted by hydroxy, $C_1$–$C_4$alkyl, halogen or $C_1$–$C_4$alkoxy, or is unsubstituted or $C_1$–$C_4$alkyl-substituted $C_4$–$C_7$cycloalkyl, or $C_1$–$C_{18}$alkyl which is unsubstituted or substituted by halogen, cyano, $C_2$–$C_4$alkanoyloxy, hydroxy, $C_1$–$C_4$alkoxy, phenoxy or phenyl, which phenyl or phenoxy is unsubstituted or substituted by hydroxy, $C_1$–$C_4$alkyl, halogen or $C_1$–$C_4$alkoxy, and the $C_1$–$C_{18}$alkyl is optionally interrupted by one or more oxygen atoms, or wherein R$_1$ and R$_2$, together with the linking nitrogen atom, form a piperidinyl, pyrrolidinyl or morpholinyl radical.

3. A dye according to claim 1, wherein R$_2$ is unsubstituted $C_1$–$C_8$alkyl or a radical of formula

(2), wherein R$_3$ is $C_2$–$C_4$alkylene, R$_4$ is $C_2$–$C_8$alkylene and L is hydrogen, hydroxy, —O —phenyl, —O—$C_1$–$C_8$alkyl or —OCO—$C_1$–$C_8$alkyl.

4. A dye according to claim 1, wherein X is unsubstituted $C_1$–$C_8$alkyl.

5. A dye according to claim 4, wherein X is methyl.

6. A dye according to claim 1 of formula

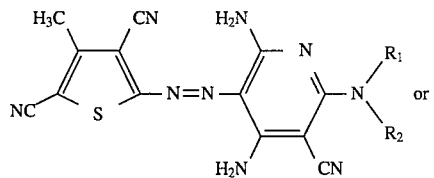

(3)

or

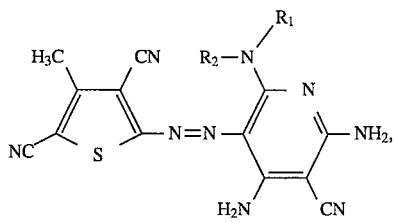

(4)

wherein R$_1$ is hydrogen, and R$_2$ is as defined in claim 1.

7. A dye according to claim 6, wherein R$_1$ is hydrogen, and R$_2$ is $C_1$–$C_6$alkyl, preferably n-butyl, n-pentyl or n-hexyl, $C_1$–$C_3$alkoxy-$C_2$–$C_3$alkyl, phenyl, methoxyphenyl or a radical of formula

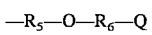

(5)

wherein R$_5$ is $C_2$–$C_3$alkylene, R$_6$ is $C_2$–$C_4$alkylene and Q is phenoxy, $C_1$–$C_4$alkoxy or propionyloxy, or wherein R$_1$ and R$_2$, together with the linking nitrogen atom, form a pyrrolidinyl, piperidinyl or morpholinyl radical.

8. A dye mixture comprising at least two dyes of the formula

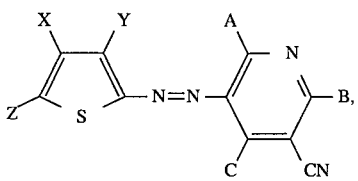

(1)

wherein X is hydrogen, halogen, $C_1$–$C_8$alkyl or phenyl which is unsubstituted or substituted by fluoro, chloro, bromo, methyl, methoxy or nitro; Y is cyano or nitro; Z is nitro, cyano, acetyl, benzoyl, formyl, —CH=C(CN)$_2$ or —CH=C(CN)CO$_2$R, and R is $C_1$–$C_4$alkyl, and A, B and C are each independently of one another —NH$_2$ or —N(R$_1$)R$_2$, and R$_1$ and R$_2$ are each independently of each other hydrogen, phenyl which is unsubstituted or substituted by hydroxy, $C_1$–$C_4$alkyl, halogen or $C_1$–$C_4$alkoxy, or is unsubstituted or $C_1$–$C_4$alkyl-substituted $C_4$–$C_7$cycloalkyl, or $C_1$–$C_{18}$alkyl which is unsubstituted or substituted by halogen, cyano, $C_2$–$C_4$alkanoyloxy, hydroxy, $C_1$–$C_4$alkoxy, phenoxy or phenyl, which phenyl or phenoxy is in turn unsubstituted or substituted by hydroxy, $C_1$–$C_4$alkyl, halogen or $C_1$–$C_4$alkoxy, and the $C_1$–$C_{18}$alkyl radical is optionally interrupted by one or more oxygen atoms, or wherein R$_1$ and R$_2$, together with the linking nitrogen atom, form a piperidinyl, pyrrolidinyl or morpholinyl radical.

9. A process for dyeing or printing semi-synthetic or synthetic hydrophobic textile material, which comprises applying to, or incorporating in, said material one or more than one compound as defined in claim 1.

10. A process according to claim 9, wherein the hydrophobic fibre material is polyester fibre material.

* * * * *